US012649322B2

(12) United States Patent
Suzuki

(10) Patent No.: US 12,649,322 B2

(45) Date of Patent: Jun. 9, 2026

(54) INKJET RECORDING APPARATUS WITH HUMIDIFIED AIR CONTROL OF ULTRAFINE PARTICLES GENERATED BY THE INK

(71) Applicant: KYOCERA Document Solutions Inc., Osaka (JP)

(72) Inventor: Motoki Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 118 days.

(21) Appl. No.: 18/751,146

(22) Filed: Jun. 21, 2024

(65) Prior Publication Data

US 2024/0424809 A1 Dec. 26, 2024

(30) Foreign Application Priority Data

Jun. 22, 2023 (JP) ................................ 2023-102415

(51) Int. Cl.
*B41J 11/00* (2006.01)
*B41J 2/045* (2006.01)

(52) U.S. Cl.
CPC ....... *B41J 11/0015* (2013.01); *B41J 2/04563* (2013.01); *B41J 2/04566* (2013.01); *B41J 11/009* (2013.01); *B41J 2203/01* (2020.08)

(58) Field of Classification Search
CPC .. B41J 11/0015; B41J 11/009; B41J 2/04563; B41J 2/04566; B41J 2203/01
USPC .......................................................... 347/101
See application file for complete search history.

(56) References Cited

U.S. PATENT DOCUMENTS

| | | | | |
|---|---|---|---|---|
| 2011/0298859 A1* | 12/2011 | Kato | B41J 29/38 | 347/16 |
| 2014/0152730 A1* | 6/2014 | Sato | B41J 2/2146 | 347/14 |
| 2023/0271440 A1* | 8/2023 | Kobayashi | B41J 29/38 | |
| 2024/0308245 A1* | 9/2024 | Jogo | C09D 11/30 | |

FOREIGN PATENT DOCUMENTS

| | | | |
|---|---|---|---|
| JP | 2012058658 A | 3/2012 | |
| JP | 2014092718 A | 5/2014 | |
| JP | 2019144494 A | 8/2019 | |
| WO | WO-2017061264 A1 * | 4/2017 | B41J 2/165 |

* cited by examiner

*Primary Examiner* — Mark Edwards
(74) *Attorney, Agent, or Firm* — Studebaker Brackett PLLC

(57) ABSTRACT

An inkjet recording includes a conveyance path that conveys a recording medium, a recording head, at least one humidity measuring part, and at least one humidifying air supplying part. The recording head discharges ink onto the recording medium conveyed along the conveyance path. At least one humidity measuring part measures humidity in the vicinity of the recording head. At least one humidifying air supplying part supplies humidifying air to the conveyance path. When the humidity measured by the humidity measuring part is equal to or less than a predetermined humidity threshold value, inkjet recording apparatus supplies the humidified air by the humidified air supplying part.

5 Claims, 2 Drawing Sheets

INKJET RECORDING APPARATUS WITH HUMIDIFIED AIR CONTROL OF ULTRAFINE PARTICLES GENERATED BY THE INK

INCORPORATION BY REFERENCE

This application is based on and claims the benefit of priority from Japanese Patent application No. 2023-102415 filed on Jun. 22, 2023, the entire contents of which are incorporated herein by reference.

BACKGROUND

The present disclosure relates to an inkjet recording apparatus for discharging ink onto a recording medium by a recording head.

Conventionally, an image forming apparatus being an inkjet recording apparatus is equipped with a conveyance path conveying a recording medium, such as a sheet, and a recording head discharging ink onto the recording medium conveyed along the conveyance path to form an image on the recording medium. By the way, an electrophotographic image forming apparatus forms a toner image on the recording medium, and then, fixes an unfixed toner image on the recording medium by a fixing member, such as a heated fixing roller. However, in the electrophotographic image forming apparatus, siloxane is released when the fixing member is heated to high temperature, and this siloxane is aggregated or polymerized in air to generate ultrafine particles (UFPs) and cause environmental pollution. Therefore, in the image forming apparatus, it is required to restrain generation of the UFPs.

For example, in a conventional image forming apparatus, the fixing device has a fixing rotor equipped with a heating member that heats a sheet on which a toner image has been transferred in contact with the sheet and a heating member side elastic layer that supports the heating member. A controlling part has a normal fixing temperature control mode for maintaining temperature of the heating member within a range between a predetermined fixing temperature upper limit and a predetermined fixing temperature lower limit, and an ultrafine particle generation temperature control mode for having a heating state in which the temperature of the heating member is maintained at an ultrafine particle control temperature upper limit higher than the fixing temperature upper limit by 10° C. or more and a heating stop state in which heating of the heating member is stopped. This is intended to restrain generation of UFPs from the fixing device.

Alternatively, in a conventional image forming apparatus, a device controlling part acquires a generation amount state value from a generation amount state value outputting part during image forming to determine a mode switching value by acquiring from a mode switching value outputting part by the acquired generation amount state value. The device controlling part forms an image at a normal mode when a continuous printing state value acquired from a continuous printing state value outputting part is less than a predetermined mode switching value, or forms the image at an ultrafine particle restriction mode when the continuous printing state value acquired from the continuous printing state value outputting part exceeds the predetermined mode switching value. Then, when forming images in the ultrafine particle restriction mode, the device controlling part sets temperature of the fixing device to lower temperature than in the normal mode by the fixing temperature controlling part, and sets passing speed of the sheet in the fixing device to slower passing speed than in the normal mode by a passing speed controlling part. This reduces a generation amount of UFPs while maintaining high productivity in image formation.

By the way, in an image forming apparatus, as an example of the polymerization reaction of siloxane, some water molecules decomposed by ozone become radical initiators, and the number of water molecules in the apparatus, or humidity, has a significant effect on the generation amount of UFPs.

Therefore, a conventional image forming apparatus is equipped with a temperature and humidity sensing part that senses temperature and water vapor amount of air in a space including at least one end of a fixing and pressurizing part, a heating part that maintains surface temperature of the fixing and pressurizing part above a first threshold value when heating and pressurizing a medium, and a dehumidifying part that dehumidifies the air so that the water vapor amount of the air is below a second threshold value. This reduces the generation amount of UFPs by lowering the humidity.

However, in an inkjet type image forming apparatus, such as an inkjet recording apparatus, ultrafine particles (UFPs) are generated by a different mechanism than in an electrophotographic image forming device. When the inkjet recording apparatus performs inkjet printing, UFPs are generated from minute ink splashes generated when the ink is discharged from a recording head or when the ink lands on a surface, or from minute suspended matter that is released from the ink in the air when the ink dries. Therefore, it is necessary to restrain the generation amount of UFPs in the inkjet recording apparatus by using different methods from the electrophotographic image forming apparatus.

SUMMARY

An inkjet recording apparatus in accordance with the present disclosure includes a conveyance path that conveys a recording medium, a recording head, at least one humidity measuring part, and at least one humidifying air supplying part. The recording head discharges ink onto the recording medium conveyed along the conveyance path. At least one humidity measuring part measures humidity in the vicinity of the recording head. At least one humidifying air supplying part supplies humidifying air to the conveyance path. When the humidity measured by the humidity measuring part is equal to or less than a predetermined humidity threshold value, inkjet recording apparatus supplies the humidified air by the humidified air supplying part.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE INVENTION

First, the overall configuration of a printer 1 as an inkjet type image forming apparatus, i.e., an inkjet recording apparatus will be described with reference to FIG. 1. For convenience of explanation, it will be described so that the front side of the printer 1 is positioned at a near side on a paper sheet of FIG. 1. The arrows L, R, U, and Lo, which are attached to each figure as appropriate, indicate the left side, right side, upper side, and lower side of the printer 1, respectively.

Figure 1:
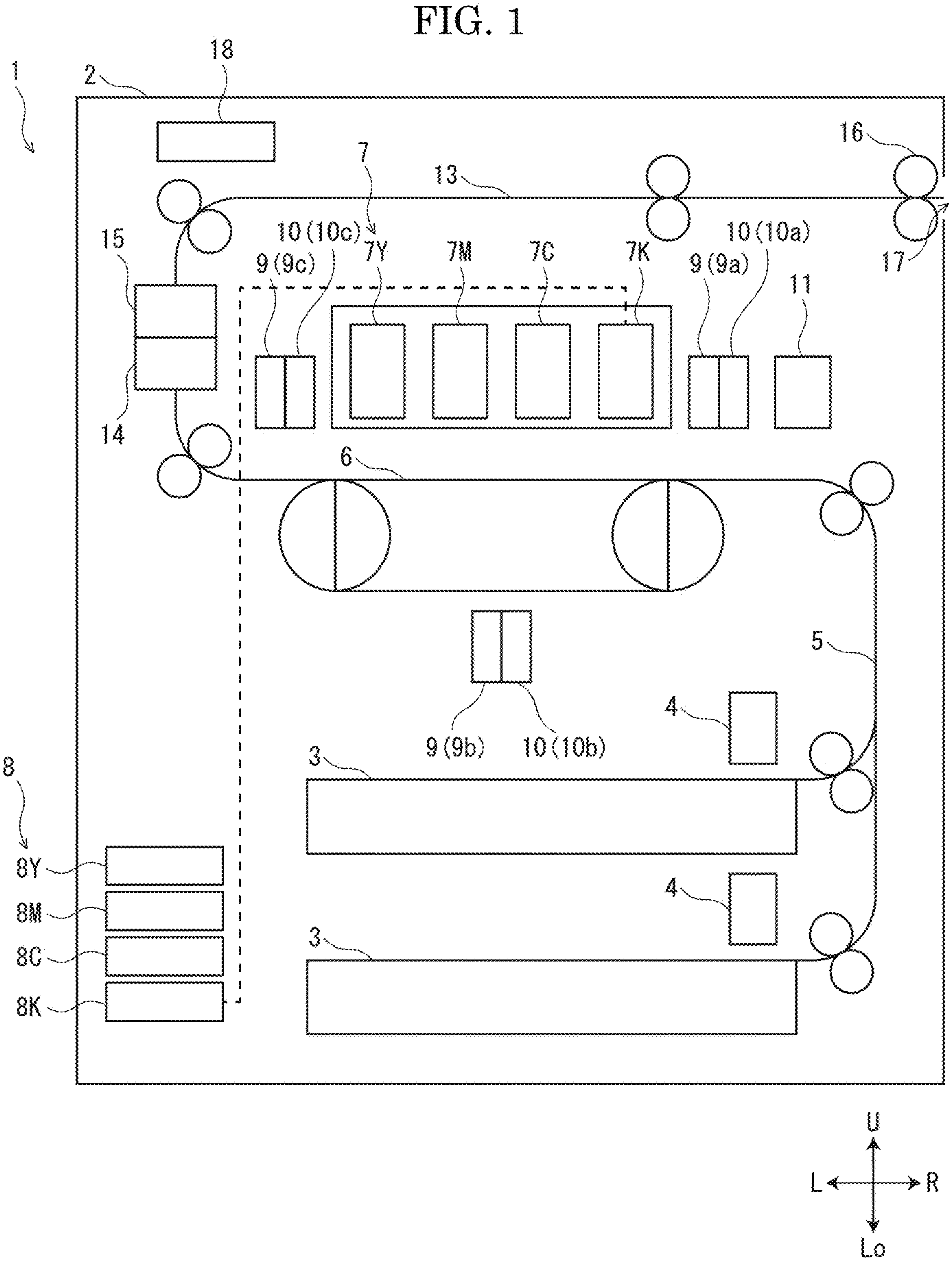
FIG. 1 is a cross-sectional view schematically showing an example of a printer in accordance with one embodiment of the present disclosure.

As shown in FIG. 1, the printer 1 includes a box-shape printer body 2. In a lower part of the printer body 2, a sheet feeding cartridge 3 storing sheets (recording mediums) is drawably housed. Near the sheet feeding cartridge 3, a sheet sensor 4 is provided to detect the sheet stored in the sheet feeding cartridge 3 or the sheet being conveyed from the sheet feeding cartridge 3. The sheet sensor 4 detects, for example, characteristics such as surface roughness and thickness of the sheet, and can determine the type of sheet on the basis of detection results.

In a right part inside the printer body 2, a first conveyance path 5 of the sheet is arranged and, in a center part inside the printer body 2, a conveying belt 6 (a conveyance path) is provided above the sheet feeding cartridge 3 and recording heads 7 are provided above the conveying belt 6. The first conveyance path 5 is provided from the sheet feeding cartridge 3 to the conveying belt 6 and, along a conveying direction of the sheet through the first conveyance path 5, a sheet feeding roller, a conveying roller, a registration roller and others are located in order to convey the sheet the conveying belt 6.

The conveying belt 6 functions s a second conveyance path conveying the sheet printed by the recording head 7. The conveying belt 6 is wound around a drive roller, a following roller, and a tensioning roller. The conveying belt 6 is controlled by a controlling part 18 described below so as to rotate, for example, counterclockwise in the front view, in response to the rotation of the drive roller, and to convey the paper on the conveying belt 6 from the right side to the left side. Incidentally, the conveying belt 6 may be configured so as to ascent and descent in upward and downward directions inside the printer body 2. The conveying belt 6 moves to a print position close to recording heads 7 in printing operation or moves to an evacuation position separate from the recording heads 7 in non-printing operation.

As the recording heads 7 that perform printing by discharging the ink onto the sheet conveyed by the conveying belt 6. four recording heads 7K, 7C, 7M, and 7Y corresponding to inks of four colors of black, cyan, magenta, and yellow, respectively, are provided. The recording heads 7K, 7C, 7M, and 7Y are arranged in a line above the conveying belt 6 in sequential order from an upstream side (a right side) in the conveying direction of the sheet. The recording heads 7K, 7C, 7M, and 7Y face a top face of the conveying belt 6 in printing operation and discharges black, cyan, magenta, and yellow inks, respectively, onto the sheet on the conveying belt 6.

Inside the printer body 2, as ink containers that contain the ink to be supplied to the recording heads 7, four ink containers 8K, 8C, 8M, and 8Y, which contain for color inks of black, cyan, magenta, and yellow, respectively, are provided. The ink containers 8K, 80, 8M, and 8Y are arranged in a line, for example, at a lower left side inside the printer body 2 in sequential order from a lower side. The ink containers 8K, 8C, 8M, and 8Y are, for example, attachably/detachably housed in respective container housing sections (not shown) provided on the lower left side inside the printer body 2.

Each recording head 7 is connected to each ink container 8 via an ink supply mechanism (not shown) consisting of a suction pump and a sub-tank. Incidentally, in FIG. 1, connection of the recording head 7K of black and the ink container 8K of black is illustrated, but connections of the recording heads 7C, 7M, and 7Y of cyan, magenta, and yellow and the ink containers 8C, 8M, and 8Y of cyan, magenta, and yellow are omitted.

In the second conveyance path consisting of the conveying belt 6, at least one temperature and humidity measuring part 9 (humidity measuring part) that measures temperature and humidity in the vicinity of the recording heads 7 and at least one humidifying air supplying part 10 that supplies humidifying air to the second conveyance path. Moreover, in the second conveyance path, a UFP sensor 11 that detects a generation amount of ultrafine particles (UFPs) may be provided.

The temperature and humidity measuring part 9 is provided at a position where the temperature and humidity in the vicinity of the recording heads 7 can be measured. The temperature and humidity measuring part 9 may be provided with two sensors of a sensor measuring the temperature and a sensor measuring the humidity in the vicinity of the recording heads 7. Preferably, the temperature and humidity measuring part 9 should be arranged together with the humidified air supplying part 10 so as to measure the temperature and humidity in an area where the humidified air by the humidified air supplying part 10 is supplied. For example, the temperature and humidity measuring part 9 is provided at an upstream side position from a facing position to the recording heads 7 in a conveying direction of the second conveyance path. Alternatively, the temperature and humidity measuring part 9 may be provided at the facing position to the recording heads 7, or at a downstream side position from the facing position to the recording heads 7 in the conveying direction of the second conveyance path.

Alternatively, when the humidified air supplying part 10 supplies the humidified air at multiple locations, the temperature and humidity measuring part 9 may be provided corresponding to each location where the humidified air is supplied. For example, a plurality of temperature and humidity measuring parts 9 may be provided at two or more of the upstream side position, the facing position, and the downstream side position relative to the recording heads 7.

If the humidified air supplying part 10 were configured and arranged so as to discharge the humidified air directly into a space of the recording heads 7, when the humidity in the vicinity of the recording heads 7 was too high, a drying rate of a printing surface may be slow down, causing image failure. In addition, the vapor condensed in the air by the humidified air may affect discharging of ink droplets by the recording heads 7. Furthermore, if a humidity gradient occurs where the humidity is high in the vicinity of the recording heads 7 and decreases as being away from the recording heads 7, it is feared that splashes that ride on an air path and away from the recording heads 7 will dry and become UFPs.

Therefore, it is preferable that the humidifying air supplying part 10 be configured and arranged so as to release the humidifying air encompassing an area where the ink discharged from the recording heads 7 splashes. For example, the humidifying air supplying part 10 is provided at the upstream side position from the facing position to the recording heads 7 in the conveying direction of the second conveyance path. Alternatively, the humidifying air supplying 10 may be provided at the facing position to the recording heads 7, or at the downstream side position from the facing position to the recording heads 7 in the conveying direction of the second conveyance path.

Alternatively, the humidifying air supplying part 10 may be arranged to supply the humidifying air to the recording heads 7 at multiple locations. For example, a plurality of humidifying air supplying parts 10 may be provided at two or more of the upstream side position, the facing position, and the downstream side position relative to the recording heads 7 to perform humidification processing from multiple locations.

Incidentally, the temperature and humidity measuring part 9 and the humidifying air supplying part 10 may be provided at different locations, or they may be provided at the same location as an integrated unit or as separate devices.

Furthermore, inside the printer body 2, from s left side of the conveying belt 6 to an upper side, a third conveyance path 13 is provided to convey the sheet printed by the recording heads 7 for ejection, and, on the third conveyance path 13, a drying device 14, a curl correction device 15, and an ejecting roller 16 are provided. On a right side face of the printer body 2, an ejecting port 17 is formed near the ejecting roller 16, and a ejected sheet tray (not shown) is provided below the ejecting port 17 to protrude to the right side.

Inside the printer body 2, a controlling device 18 is provided to control each part of the printer 1. The controlling device 18 comprises a controlling part as a computer composed of a central processing unit (CPU) or the like, and a storing part composed of ROM, RAM, HDD, or the like, and controls each part of the printer 1 connected to the controlling device 18 by executing arithmetic process by the controlling part on the basis of control programs and control data stored in the storing part.

By the way, in the printer 1 that prints by inkjet method, ultrafine particles (UFPs) may be generated at each stage of ink discharging, ink landing, and ink drying to cause environmental pollution. For example, when the ink is discharged from the recording heads 7, the UFPs are generated when splashes splashed during ink discharging or satellite droplets formed after a main droplet dry in the air. When the ink lands on the sheet or the like, splashes are splashed when the main droplet lands on a sheet surface, and the UFPs are generated when the splashes dry. When the ink dries on the sheet or the like, ink components are suspended with moisture when the ink dries, and the UFPs are generated when the ink dries as it does. In particular, the satellite droplets generated by ink discharging are involved in generation of the UFPs.

In addition, on a process in which the ink splashes dry and the UFPs are generated, the temperature and humidity have a significant effect. Generally, high temperature and low humidity increase the drying rate of the ink droplets, while low temperature and high humidity decreases the drying rate of the ink droplets. Then, when drying of the ink splashes is slow due to low temperatures and high humidity, the splashes reach the sheet or aggregate (condense) each other, and therefore, the generation amount of the UFPs is reduced. On the other hand, when drying of the ink splashes is fast due to high temperature and low humidity, more splashes dry in the air before aggregation, and therefore, a large number of the UFPs are generated. Incidentally, When the aggregation of the splashes is accelerated, the size of the UFPs increases, and therefore, the UFPs are easily collected by filtering or other means.

In other words, in inkjet printing in the printer 1, by increasing internal humidity of the printer body 2, especially humidity in the vicinity of the recording heads 7 where the ink is discharged, it is possible to restrain the generation amount of the UFPs. Therefore, the printer 1 of the present embodiment is designed to restrain generation of the UFPs by controlling the internal humidity of the printer body 2.

The controlling device 18 controls supplying of the humidified air by the humidified air supplying part 10 according to the humidity measured by the temperature and humidity measuring part 9.

First, the controlling device 18 inputs the humidity (current humidity W) measured by the temperature and humidity measuring part 9 from the temperature and humidity measuring part 9, and decides whether or not the humidity W is equal to or less than a predetermined humidity threshold value $W_L$. Here, the humidity threshold value $W_L$ corresponds to a threshold value at which the generation amount of the UFPs is less than a predetermined standard value (e.g., a standard value for environmental protection). For example, the controlling device 18 measures the internal temperature T of the printer body 2 by the temperature and humidity measuring part 9 and calculates the humidity threshold value $W_L$ by the result of multiplying a predetermined correction factor $K_1$ and the internal temperature T.

Next, the controlling device 18 controls the internal humidity of the printer body 2 to exceed the humidity threshold value $W_L$ by supplying the humidified air by the humidified air supplying part 10 when the current humidity W is equal to or less than the humidity threshold value $W_L$. Here, the controlling device 18 controls the supplying amount H of the humidified air by the humidified air supplying part 10 to satisfy the following formula (1) using a predetermined correction factor $K_2$, the humidity threshold value $W_L$, and the current humidity W.

$$1.5*K_2*(W_L-W)>H>K_2*(W_L-W) \tag{1}$$

When supplying the humidifying air by the humidifying air supplying part 10, the controlling device 18 measures and monitors the internal humidity of the printer body 2 by the temperature and humidity measuring part 9, and if the internal humidity exceeds the humidity threshold value $W_L$ by supplying the humidifying air, the controlling device 18 supplying the terminates of humidifying air by the humidifying air supplying part 10.

Moreover, the controlling device 18 may decides whether a detection result of the UFP sensor 11 (the generation amount of the UFPs) is equal to or less than the predetermined standard value (e.g., the standard value for environmental preservation), and may control the humidified air supplying part 10 according to deciding result. For example, the controlling device 18 controls to perform supplying of the humidified air by the humidified air supplying part 10 when the generation amount of the UFPs exceeds the standard value. On the other hand, the controlling device 18 controls to stop supplying of the humidified air by the humidified air supplying part 10 when the generation amount of the UFPs is equal to or less than the standard value.

Figure 2:
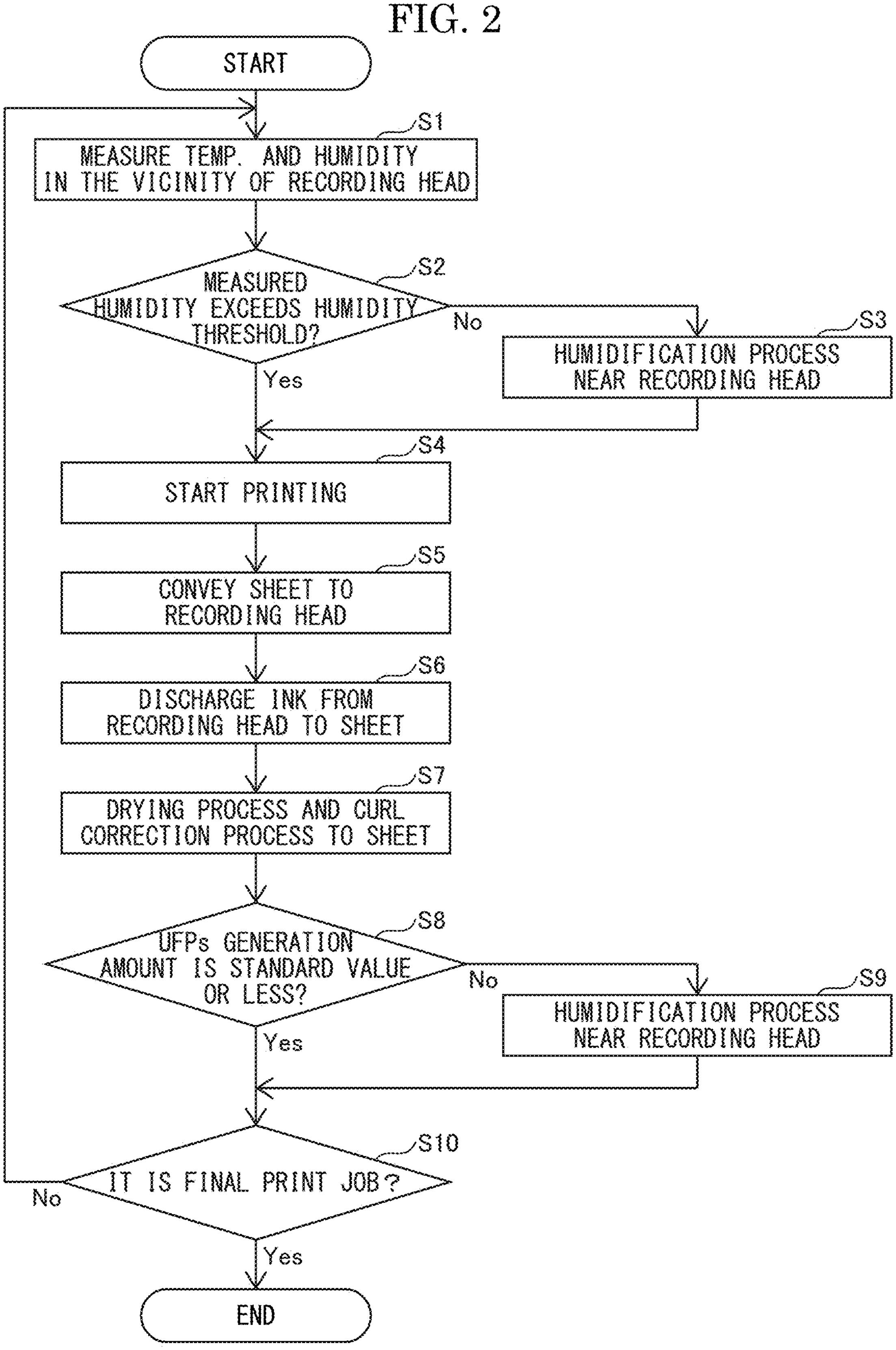
FIG. 2 is a flowchart showing an example of operation of the printer in accordance with one embodiment of the present disclosure.

Next, an example of operation of the printer 1 in the present embodiment will be described with reference to the flowchart in FIG. 2.

First, in the printer 1, when a print job is issued and printing is started, the controlling device 18 measures the temperature and humidity as environmental data in the vicinity of the recording heads 7 by the temperature and humidity measuring part 9 (step S1).

The controlling device 18 decides whether or not the measured humidity (the current humidity W) exceeds the humidity threshold value (step S2). If the current humidity W is equal to or less than the humidity threshold value (step S2: No), the controlling device 18 performs supplying of the humidified air to the second conveyance path consisting of the conveying belt 6 as the humidification process by the humidified air supplying part 10 (step S3), and then, starts printing by the current print job (step S4).

On the other hand, if the current humidity W exceeds the humidity threshold value (Step S2: Yes), the controlling device 18 starts printing by the current print job without performing supplying of the humidified air (Step S4).

When printing is started, the controlling device 18 controls to convey the sheet from the sheet feeding cartridge 3 to the conveying belt 6 and the recording heads 7 via the first conveyance path 5 (step S5), and moreover, controls to convey the sheet by the second conveyance path consisting of the conveying belt 6, and simultaneously to perform printing by discharging the ink onto the sheet on the conveying belt 6 (step S6). Furthermore, the controlling device 18 controls to convey the printed sheet toward the ejecting port 17 via the third conveyance path 13, and simultaneously to dry the ink printed on the sheet as drying process by the drying device 14 and to correct curl of the sheet as curl correction process by the curl correction device 15 (Step S7).

Thus, when printing of the current print job is completed, the controlling device 18 decides whether or not the generation amount of the UFPs is equal to or less than the predetermined standard value by the UFP sensor 11 (step S8). If the generation amount of the UFPs exceeds the standard value (step S8: No), the controlling device 18 performs supplying of the humidified air to the second conveyance path consisting of the conveying belt 6 by the humidified air supplying part 10 (step S9).

On the other hand, when the generation amount of the UFPs is less than the standard value (step S8: Yes), the controlling device 18 decides whether or not the current print job is the final print job (step S10), and if it is not the final print job (step S10: No), it moves to step S1 to the next print job, while if it is the final print job (step S10: Yes), the operation is finished.

As described above, in the present embodiment, the printer 1 being the inkjet recording apparatus comprises the second conveyance path (the conveyance path) consisting the conveying belt 6 that conveys the sheet (the recording medium), the recording head 7 that discharges the ink onto the sheet conveyed along the second conveyance path, at least one temperature and humidity measuring part 9 (the humidity measuring part) that measures the humidity in the vicinity of the recording head 7, and at least one humidifying air supplying part 10 that supplies the humidifying air to the second conveyance path. The controlling device 18, which controls each part in the printer 1, supplies the humidified air by the humidified air supplying part 10 when the humidity measured by the temperature and humidity measuring part 9 is equal to or less than the predetermined humidity threshold value.

Thereby, by sufficiently increasing the humidity in the vicinity of the recording head 7, since the splashes splashed and the satellite droplets formed during ink discharging, the splashes splashed during ink landing, the ink components suspended during ink drying and others are restrained from drying in the air and aggregated, it is possible to restrain the generation of the ultrafine particles (UFPs).

In the present embodiment, the humidifying air supplying part 10 supplies the humidifying air to at least one among the facing position to the recording head 7, the upstream side position from the facing position to the recording head 7 in the conveying direction of the second conveyance path, and the downstream side position from the facing position to the recording head 7 in the conveying direction of the second conveyance path.

Thereby, it is possible to restrain the ink splashes and others from drying at appropriate positions in the vicinity of the recording head 7 inside the printer body 2 and to restrain the generation of the ultrafine particles.

Next, the printer 1 in accordance with a first modified example of the present embodiment will be described. In the first modified example, while the printer 1 has the same configuration as the printer 1 of the embodiment described above, a plurality of humidified air supplying parts 10 are provided. At a plurality of locations where the plurality of humidified air supplying parts 10 supply the humidified air, the humidity may differ from each other due to air flowing along the second conveyance path consisting of the conveying belt 6.

Therefore, the controlling device 18 sets a plurality of humidity threshold values for the plurality of humidified air supplying parts 10, respectively. Then, the controlling device 18 compares the plurality of humidity threshold values with the humidity (the current humidity W) measured by the temperature and humidity measuring part 9, and controls (decides), among the plurality of humidified air supplying parts 10, which humidified air supplying part 10 should supply the humidified air according to comparison results. Thereby, if an air path is generated inside the printer body 2, and then, the splashes fly to a position far from the recording head 7, it is possible to restrain the splashes from drying and to restrain the generation of the ultrafine particles.

For example, in the printer 1, as the plurality of humidified air supplying parts 10, a first humidified air supplying part 10*a* is provided corresponding to the upstream side position from the facing position to the recording head 7 in the conveying direction of the second conveyance path, a second humidified air supplying part 10*b* is provided corresponding to the facing position to the recording head 7, and a third humidified air supplying part 10*c* is provided corresponding to the downstream side position from the facing position to the recording head 7 in the conveying direction of the second conveyance path. In this case, as the plurality of temperature and humidity measuring parts 9, a first temperature and humidity measuring part 9*a* is provided corresponding to the first humidified air supplying part 10*a*, a second temperature and humidity measuring part 9*b* is provided corresponding to the second humidified air supplying part 10*b*, and a third temperature and humidity measuring part 9*c* is provided corresponding to the third humidified air supplying part 10*c*.

The controlling device 18 sets, as the plurality of humidity threshold values, a first humidity threshold value for a supplying position of the humidified air by the first humidified air supplying part 10*a*, a second humidity threshold value for a supplying position of the humidified air by the second humidified air supplying part 10*b*, and a third humidity threshold value for a supplying position of the humidified air by the third humidified air supplying part 10*c*.

Then, the controlling device 18 controls supplying of the humidified air by the first humidified air supplying part 10*a* according to comparison result between the humidity measured by the first temperature and humidity measuring part 9*a* and the first humidity threshold value, controls supplying of the humidified air by the second humidified air supplying part 10*b* according to comparison result between the humidity measured by the second temperature and humidity measuring part 9*b* and the second humidity threshold value, and controls supplying of the humidified air by the third humidified air supplying part 10*c* according to comparison result between the humidity measured by the third temperature and humidity measuring part 9*b* and the third humidity threshold value.

When an air flows from the upstream side to the downstream side in the conveying direction of the second conveyance path, the controlling device 18 increases the humidity threshold value in order of the first humidity threshold value corresponding to the upstream side position, the second humidity threshold value corresponding to the facing position, and the third humidity threshold value corresponding to the downstream side position, and thereby, can optimally maintain the drying rate of the printing surface and can optimally restrain the generation amount of the UFPs.

Next, the printer 1 in accordance with a second modified example of the resent embodiment will be described. In the second modified example, while the printer 1 has the same configuration as the printer 1 of the embodiment described above, the controlling device 18 sets humidity threshold values in a plurality of stages. Then, the controlling device 18 compares the humidity threshold values with the humidity (the current humidity W) measured by the temperature and humidity measuring part 9, and controls the supplying amount of the humidified air by the humidified air supplying part 10 according to comparison results.

For example, the controlling device 18 increases the supplying amount of the humidified air by the humidifying air supplying part 10 when the current humidity W is equal to or less than the relatively low humidity threshold value, and decreases the supplying amount of the humidified air by the humidifying air supplying part 10 when the current humidity W is equal to or less than the relatively high humidity threshold value. When a plurality of humidifying air supplying parts 10 are provided, the controlling device 18 may set the humidity threshold values in the plurality of stages for each of the plurality of humidifying air supplying parts 10.

Next, the printer 1 in accordance with a third modified example of the present embodiment will be described. In the third modified example, while the printer 1 has the same configuration as the printer 1 of the embodiment described above, the controlling device 18 sets a different humidity threshold value for respective type of recording mediums, such as the sheet, to be printed. The controlling device 18 controls supplying of the humidified air by the humidified air supplying part 10 according to comparison result between the set humidity threshold value and the humidity (the current humidity W) measured by the temperature and humidity measuring part 9.

In the printer 1, the ink behavior, such as permeability of the ink to the recording medium when the ink is discharged, may vary depending on the type of recording medium, and the humidity suitable for drying ink may vary. Therefore, in order to control humidification (humidity control) in the vicinity of the recording head 7 depending on the type of recording medium, the controlling device 18 sets the humidity threshold value corresponding to the humidified air supplying part 10 depending on the type of recording medium.

For example, in the printer 1, since the type of the sheet (the recording medium) to be printed is selected in a printing instruction from an external device, such as a personal computer, or a printing instruction by an operation unit (not shown) provided in the printer 1, the controlling part 18 functions as a deciding part that decides the type of the sheet on the basis of such a printing instruction. In addition, since the printer 1 detects characteristics of the sheet (the recording medium) to be printed by detecting the sheet stored in the sheet feeding cartridge 3 or the sheet being conveyed from the sheet feeding cartridge 3 with the sheet sensor 4, the controlling part 18 functions as a deciding part that decides the type of the sheet on the basis of such sheet characteristics.

Then, the controlling device 18 sets the humidity threshold value corresponding to the humidified air supplying part 10 depending on the type of the sheet selected in the print instruction or the type of the sheet on the basis of the paper characteristics detected by the sheet sensor 4.

For example, in a case of the sheet with relatively high permeability, because the drying rate of the sheet is fast, the controlling device 18 may set the relatively high humidity threshold value. On the other hand, in a case of the sheet with relatively low permeability, because the drying rate of the sheet is slow, the controlling device 18 may set the relatively low humidity threshold value.

Although the embodiment has been described about a case where a configuration of the present disclosure is applied to the printer 1 as the image forming apparatus, in another embodiment, the configuration of the present disclosure may be applied to another image forming apparatus, such as a copying machine, a facsimile or a multifunction peripheral, as long as it is equipped with the inkjet type ink supplying mechanism.

The invention claimed is:

1. An inkjet recording apparatus comprising:

a conveyance path that conveys a recording medium;

a recording head that discharges ink onto the recording medium conveyed along the conveyance path;

at least one humidity measuring part that measures humidity in the vicinity of the recording head; and at least one humidifying air supplying part that supplies humidifying air to the conveyance path, wherein when the humidity measured by the humidity measuring part is equal to or less than a humidity threshold value, that is set so that a generation amount of ultrafine particles caused by the ink is less than a predetermined standard value, supplying the humidified air by the humidified air supplying part.

2. The inkjet recording apparatus according to claim 1 wherein, the humidifying air supplying part supplies the humidifying air to at least one among a facing position to the recording head, an upstream side position from the facing position to the recording head in a conveying direction of the conveyance path, and a downstream side position from the facing position to the recording head in the conveying direction of the conveyance path.

3. The inkjet recording apparatus according to claim 2 wherein, a plurality of the humidified air supplying parts are provided respectively corresponding to the facing position, the upstream side position, and the downstream side position, comparing a plurality of the humidity threshold values respectively set for the plurality of the humidified air supplying parts with the humidity measured by the humidity measuring part, and controlling, among the plurality of the humidified air supplying parts, which humidified air supplying part should supply the humidified air according to comparison results.

4. The inkjet recording apparatus according to claim 1 wherein, comparing the humidity measured by the humidity measuring part with the humidity threshold values being in a plurality of stages, and controlling a supplying amount of the humidified air by the humidified air supplying part according to comparison results.

5. The inkjet recording apparatus according to claim 1 comprising:

a deciding part that decides a type of the recording medium, wherein setting the humidity threshold value depending on the type of the recording medium decided by the deciding part, and controlling supplying of the humidified air by the humidified air supplying part according to comparison result between the set humidity threshold value and the humidity measured by the humidity measuring part.

* * * * *